Feb. 28, 1933.  W. M. OVERFELT  1,899,351
KING PIN EXTRACTING APPARATUS
Filed June 13, 1932
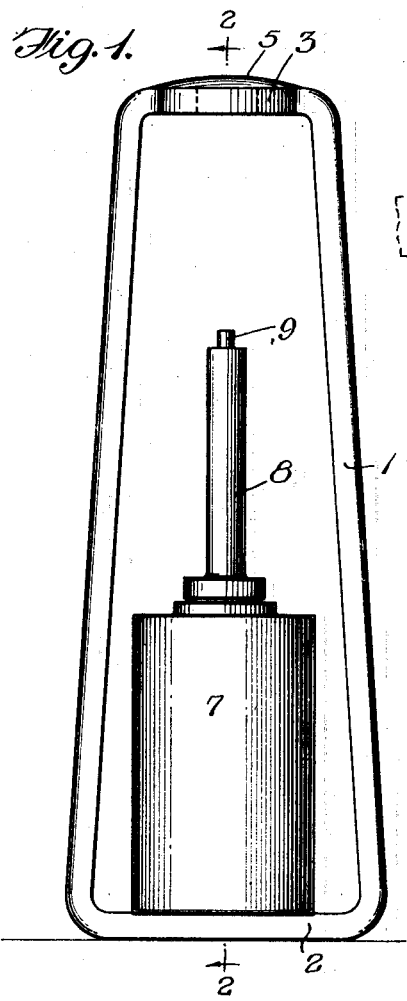
Fig. 1.
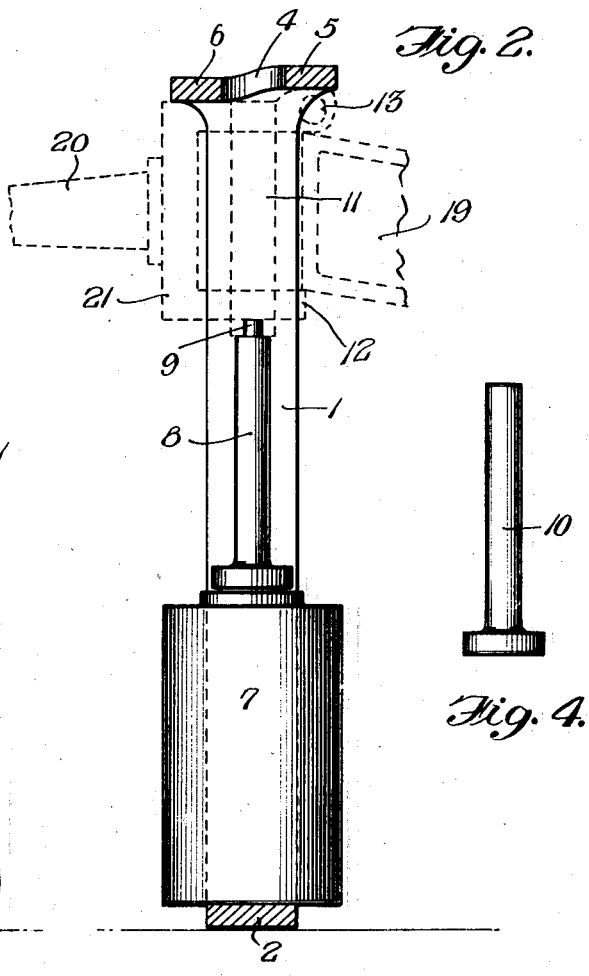
Fig. 2.
Fig. 4.
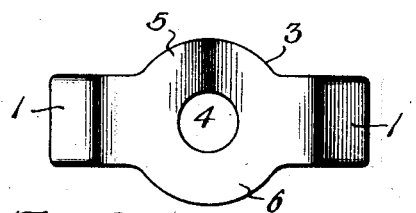
Fig. 3.
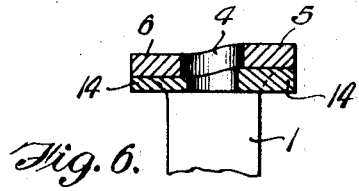
Fig. 6.
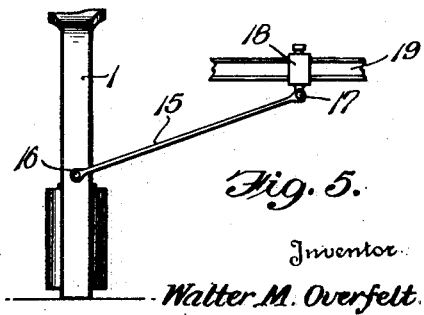
Fig. 5.
Inventor
Walter M. Overfelt.
By Albert Grobstein
Attorney Patented Feb. 28, 1933

1,899,351

UNITED STATES PATENT OFFICE

WALTER M. OVERFELT, OF ROCKY MOUNT, VIRGINIA

KING PIN EXTRACTING APPARATUS

Application filed June 13, 1932. Serial No. 617,003.

This invention relates to an apparatus for extracting king pins from vehicles, and particularly to a novel apparatus for extracting or removing king pins by hydraulic pressure from automobile axles.

A frequent operation necessary, either for repair purposes, or for disassembly of an automobile, is the removal of what is known as the king pin from the front axle assembly. This is a laborious and difficult job, even under the best conditions. The present invention is directed to the end of making such a job simple and easy, with less damage to parts than heretofore practiced.

In the prior art, numerous proposals have been made for removing king pins from front axles of automobiles, and such prior proposals utilize or contemplate the use of screw threaded devices which are attached directly to the automobile axle, and by rotating a threaded pressure element, the pin is slowly forced upwardly and finally out of its operative position. Such a threading operation requires manual work from an awkwardly low position beneath the axle, is slow and laborious, and furthermore such devices frequently transmit bending pressure and stress upon the front axle, with dangerous immediate or potential results. Oftentimes, the pressure in removing the king pin, which is directly transmitted to the axle might be sufficient to deform or bend the axle; and sometimes the part which is unduly stressed fails at the stressed point in later service.

The present invention obviates all the prior difficulties and disadvantages of the prior art, and not only saves time in the removal of king pins, but permits an easy and simple removal with less effort than formerly required, together with elimination of undue strain and stress upon the axle or other working parts.

The preferred embodiment is herewith described, but it need not be followed slavishly, and the invention is to be considered as broadly as the scope of the appended claims permits in view of the prior art.

Figure 1 is a front elevation of the apparatus, the hydraulic jack being shown diagrammatically.

Figure 2 is a section taken on a line 2—2 of Figure 1.

Figure 3 is a top plan view of Figure 1.

Figure 4 is a modified form of pusher pin.

Figure 5 is a modified form of yoke holding means.

Figure 6 is a modified form of the yoke top shown in Figure 2.

Referring to Figure 1, the frame, yoke or loop 1 is made of high strength material such as wrought iron, steel or cast iron, preferably of forged steel, and comprises a base 2 and top 3, the entire structure being in the form of a trapezoidal ring, although it may be rectangular, or, under some situations, elliptical.

The top portion 3 is widened in a circular form (as shown in Figure 3) and is provided with an opening 4 therethrough. The top portion is not flat on its top or bottom surfaces, but is provided with an offset, as clearly shown in Figure 2, thus defining a portion 5 raised above the portion 6, for the purpose hereinafter explained.

On the base 2 of the frame or loop 1, rests the hydraulic jack 7 having associated therewith the pusher element 8 provided with an end 9 of reduced cross-sectional diameter. The element 8 is adapted to be used when Model A Ford automobiles are being repaired, but with other make automobiles, the pusher element 10 of Figure 4 is used. The element 10, it will be observed, has no reduced end on the same.

The operation of the device is as follows:

The king pin 11 is desired to be removed from a Ford automobile. The axle is jacked up, the wheel removed, and the yoke 1 placed upon the spindle, as shown in Figure 2, so that the raised or offset portion 5 of the top 3 rests upon the steering knuckle or connection 13. The hydraulic jack 7 and pusher pin 8 are placed in position below the king pin 11 so that the reduced end 9 engages the lower end of the king pin.

With the application of hydraulic pressure upwardly on the base of the element 8, the king pin 11 is forced upwardly and out through the opening 4 of the yoke or frame 1. When a king pin is desired to be removed from other types of automobiles, a washer 14 is placed to compensate for the offset; or a shim may be used. In that case, also, the element 10 may be substituted for the element 8.

In Figure 5, the frame 1 is provided with an anchoring or stabilizing device comprising a strut pivoted at 16 and 17, with a clamp 18 for securing the same to the axle 19. Any tendency for the frame to slip out of position is thus prevented.

The wheel spindle 20 and flange 21 are shown for purposes of illustration only, and constitute no part of my invention.

The hydraulic jack used is preferably of the 7 ton type, but a higher or lower power jack of any type may be used. The jack details are not given, as I claim no invention in the jack per se. It will be understood that the jack may be detachably clamped or secured to the yoke 1, if desired.

The present invention is not to be confused with any mechanism for wheel pulling, as the problem of removing king pins and wheels are not alike.

I claim:

1. A king pin extracting apparatus comprising an elongated loop having a base portion and a top portion, said top portion having an opening therein, pressure means within said loop and resting on said base portion, and a pusher pin located on said pressure means and operable to force a king pin through the opening in the top portion upon actuation of the pressure means.

2. In combination, a ring-like frame member having an opening in the top portion thereof, and hydraulic pressure means located within the perimeter of the frame member and operable to press upwardly upon a king pin to force the same through the aforesaid opening when the frame member is placed in position over said king pin.

3. In an automobile king pin extractor, the combination of a loop frame member, an opening in the top portion thereof through which a king pin is adapted to pass, a strut, one end of which is pivotally connected to a side portion of said loop frame member, and clamping means pivotally connected to the other end of the strut, whereby the loop frame member may be held in positive position by anchorage to the axle of the automobile.

4. An automobile king pin extractor comprising a ring-like frame having a top portion and a base portion, said top portion having an offset circular opening, hydraulic pressure means within said frame and resting on said base portion, a pusher element having an end of reduced diameter, said pusher element being seated on said pressure means, whereby a king pin to be extracted may be contacted by the reduced end of the pusher element and be forced upwardly through the opening in the top portion of the frame.

5. An automobile king pin extracting apparatus comprising a frame member of ring-like structure, a top portion of said frame member having a circular opening and being offset to provide a raised portion on the underside of said top portion, a washer located below said offset and reversely offset correspondingly to provide a substantially flat underside surface, and hydraulic pressure means located below said washer within said frame member and operable to force a king pin through said circular opening when the frame and washer are in operative position overlying the king pin.

In testimony whereof, I hereunto set my hand.

WALTER M. OVERFELT.